US010523972B2

(12) United States Patent
Huang (10) Patent No.: US 10,523,972 B2
(45) Date of Patent: Dec. 31, 2019

(54) METHOD AND DEVICE FOR ENCODING SPACE-TIME SIGNALS

(71) Applicant: Peking University, Beijing (CN)

(72) Inventor: Tiejun Huang, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 0 days.

(21) Appl. No.: 16/042,225

(22) Filed: Jul. 23, 2018

(65) Prior Publication Data

US 2018/0332310 A1 Nov. 15, 2018

Related U.S. Application Data

(63) Continuation of application No. PCT/CN2017/072038, filed on Jan. 22, 2017.

(30) Foreign Application Priority Data

Jan. 22, 2016 (CN) .......................... 2016 1 0045011

(51) Int. Cl.
*H04N 19/85* (2014.01)
*H04N 19/503* (2014.01)
(Continued)

(52) U.S. Cl.
CPC ............. *H04N 19/85* (2014.11); *G06T 9/002* (2013.01); *H04L 1/0625* (2013.01);
(Continued)

(58) Field of Classification Search
CPC ........ H04N 19/85; H04N 19/15; H04N 19/62; H04N 19/159; H04N 19/593; H04N 19/503; H04L 1/0675; H04L 1/0625
See application file for complete search history.

(56) References Cited

U.S. PATENT DOCUMENTS

| 8,396,153 B1* | 3/2013 | Shen ...................... H04B 7/024 370/464 |
| 2007/0223367 A1* | 9/2007 | Wu ........................ H04L 1/0001 370/216 |

(Continued)

FOREIGN PATENT DOCUMENTS

| CN | 1784008 A | 6/2006 |
| CN | 1969559 A | 5/2007 |

(Continued)

OTHER PUBLICATIONS

Wen-Qin Wang, Space-Time Coding MIMO-OFDM SAR for High-Resolution Imaging Published in IEEE Transactions on Geoscience and Remote Sensing ( vol. 49, Issue: 8, Aug. 2011 ).

*Primary Examiner* — Jean B Corrielus
(74) *Attorney, Agent, or Firm* — Flener IP & Business Law; Zareefa B. Flener (57) ABSTRACT

A method for encoding space-time signals comprises: collecting space-time signals of various local spatial positions in a monitoring area, and accumulating the space-time signals according to time, so as to obtain cumulative signal intensity values; transforming the cumulative signal intensity values by means of a filter, and outputting a pulse signal when a transformation result exceeds a specific threshold; arranging pulse signals corresponding to a local spatial position into a sequence according to the time, so as to obtain a pulse sequence expressing the local spatial position signals and a change process thereof; and arranging the pulse sequences of all local spatial positions into a pulse sequence array according to interrelation among the spatial positions to serve as an encoding for dynamic space-time signals of the monitoring area.

20 Claims, 1 Drawing Sheet

(51) Int. Cl.

| | |
|---|---|
| *H04N 19/593* | (2014.01) |
| *G06T 9/00* | (2006.01) |
| *H04N 19/62* | (2014.01) |
| *H04N 19/15* | (2014.01) |
| *H04N 19/159* | (2014.01) |
| *H04L 1/06* | (2006.01) |
| *G06K 9/46* | (2006.01) |
| *G06K 9/00* | (2006.01) |

(52) U.S. Cl.
CPC ........... *H04L 1/0675* (2013.01); *H04N 19/15* (2014.11); *H04N 19/159* (2014.11); *H04N 19/503* (2014.11); *H04N 19/593* (2014.11); *H04N 19/62* (2014.11); *G06K 9/00771* (2013.01); *G06K 9/4619* (2013.01)

(56) References Cited

U.S. PATENT DOCUMENTS

| | | | |
|---|---|---|---|
| 2010/0202502 A1* | 8/2010 | Tong | H04B 7/0619 375/224 |
| 2011/0235698 A1 | 9/2011 | Petre | |
| 2012/0307928 A1* | 12/2012 | Jia | H04B 7/0667 375/267 |

FOREIGN PATENT DOCUMENTS

| | | |
|---|---|---|
| CN | 104113754 A | 10/2014 |
| CN | 104952470 A | 9/2015 |
| CN | 105681787 A | 6/2016 |
| WO | WO2004032402 A1 | 4/2004 |

* cited by examiner

METHOD AND DEVICE FOR ENCODING SPACE-TIME SIGNALS

CROSS-REFERENCE TO RELATED APPLICATIONS

The present application is a continuation of International Patent Application No. PCT/CN2017/072038 filed on Jan. 22, 2017, which claims priority to Chinese Patent Application No. 201610045011.0, filed on Jan. 22, 2016, all contents of which are incorporated by reference herein.

TECHNICAL FIELD

The present invention relates to the field of information coding technology, particularly to a method and device for encoding space-time signals.

BACKGROUND

The form that exists in a certain time and space is a source of information, for example, the propagation of light in space forms dynamic images, the flow of large numbers of water molecules produces ocean information, and the dynamic movement of air molecules and other floats forms climate information. In terms of dynamic images, humans and creatures perceive the world by capturing photons through their eyes, and the modern camera records the dynamically changing world by using CCD (Charge-coupled Device) or CMOS (Complementary Metal Oxide Semiconductor) to capture photons, which generates large amounts of image and video data.

Traditional methods of representing dynamic images are two-dimensional images and videos as sequences of images. The traditional image is a two-dimensional information form. The narrowly defined image is the result that light is projected on a photographic plane after reflection, diffuse reflection, refraction or scattering in the physical world. The generalized image includes any information form distributed on a two-dimensional plane. The image represented by the digital form is more convenient to process, transmit and store, so it is necessary to transform an image in the analog signal form into an image represented by the digital form, i.e. a digital image. The process of image digitization mainly includes three steps: sampling, quantization and coding. Sampling is a process of discretizing the space distribution of an image. For a two-dimensional image, the most common way is to divide a rectangular area covered by the image into equal-sized sampling points at equal intervals, and the number of rows of sampling points and the number of sampling points per row are usually called digital image resolution (more accurate resolution refers to the number of sampling points per unit physical size). Quantization is a process of discretizing the color (or other physical quantities) of an image at each sampling point, which is generally represented by a quantization level. The quantized values of each sampling point and its color (or other physical quantities) form one pixel of the image, and all pixels arranged in rows or columns form a digital image.

The traditional concept of video is a sequence of images obtained at a certain time interval. An image in the sequence is also called a frame image. Therefore, a video is also an image sequence. The time interval division between images is also a part of sampling. Usually, equal interval division is adopted, and the number of images collected per second is called frame rate. In order to ensure that the information is not lost in the process of digitalization, that is, complete restoration can be achieved when the information is restored to the analog form, according to the sampling theorem, it needs to be sampled at least twice the frequency of the image spatial signal.

The video collected in the traditional way produces a large amount of data after the digitalization. Taking a high-definition video as an example, the amount of data per second is 1920×1080×24 bits×30 frames per second=1492992000 bits per second, which is about 1.5 Gbps. It is almost impossible for network and storage technology to transmit such amount of data through a broadcast communication network, or to provide video services for thousands of users on the internet, or to store video data generated by millions of cameras in cities for 24 hours. A large amount of redundancy needs to be removed in high-precision digital video data, which is the central goal of digital video coding, so digital video coding is also called digital video compression. From the research of Hoffman coding and differential pulse coding modulation in the late 1840s and early 1850s, video coding technology has experienced the development for nearly 60 years. In this process, three types of classical techniques including transform coding, prediction coding and entropy coding were generally formed to remove spatial redundancy, temporal redundancy and information entropy redundancy of video signals respectively.

Based on the requirement of technology accumulation and information technology development for more than 30 years, various video coding technologies began to converge in the 1980s, and gradually formed a block-based hybrid coding framework of prediction and transformation. The hybrid coding framework was standardized by the standardization organization, and began to be applied on a large scale in the industry. There are two major international organizations specializing in the formulation of video coding standards in the world, namely the MPEG (Motion Picture Experts Group) organization under the ISO/IEC and the VCEG (Video Coding Experts Group) organization of the ITU-T. The MPEG founded in 1986 is specifically responsible for the developing of related standards in the multimedia field, which is mainly used in storage, broadcast television, streaming media on the Internet or wireless network and so on. ITU, the International Telecommunication Union, mainly formulates video coding standards for the field of real-time video communications, such as video telephony, video conference and other applications. The AVS working group, set up by China in June 2002, is responsible for formulating corresponding digital audio and video coding standards for the domestic multimedia industry.

In 1992, the MPEG organization formulated the MPEG-1 standard (launched in 1988, was a superset of ITU H.261) for VCD (Video Compact Disk) application with a data rate of about 1.5 Mbps; in 1994, the MPEG-2 standard (launched in 1990) for applications such as DVD and digital video broadcasting was released, which is applicable to bit rates of 1.5-60 Mbps or even higher; in 1998, the MPEG formulated the MPEG-4 standard (launched in 1993, based on the MPEG-2 and H263) for low bit rate transmission. ITU basically kept pace with the development of the MPEG, and also formulated a series of H.26x standards. The H261 standard, which began in 1984, was a precursor to the MPEG-1 standard and was basically completed in 1989, mainly formulated for realizing videophone and video conference on ISDN. On the basis of H.261, the ITU-T formulated the H.263 coding standard (launched in 1992) in 1996, and successively introduced H.263+, H.263++, etc.

In 2001, the ITU-T and the MPEG jointly established the JVT (Joint Video Team) working group, and set up a new video coding standard. The first edition was completed in 2003. The standard was called the tenth part of the MPEG-4 standard (MPEG-4 PartAVC) in the ISO, and called the H.264 standard in the ITU. Four months later, the Microsoft-led VC-1 video coding standard was promulgated as an industry standard by the Society of Motion Picture and Television Engineers (SMPTE) of America. In 2004, a national standard with independent intellectual property rights was developed in China, and it was promulgated as a national standard of "information Technology Advanced Audio and Video Coding Part II Video" (National label GB/T 20090.2-2006, usually referred to as the AVS video coding standard for short) in February 2006, after industrialization verification such as chip implementation. These three standards are usually referred to as the second generation video coding standard, and their coding efficiency is double that of the first generation, and the compression ratio is up to about 150 times, that is, a high-definition video (under the condition that the quality meets the broadcast requirements) may be compressed to 10 Mbps or less.

In the first half of 2013, ITU-T H.265 and ISO/IEC HEVC (High Efficiency Video Coding) as the third generation video coding international standard were promulgated, and the coding efficiency was doubled that of H.264. In parallel with this, China formulated the second generation AVS standard AVS2, which is called "Information Technology Efficient Multimedia Coding". Compared with the first generation AVS standard, the code rate of AVS2 is reduced by more than 50%, which means that the coding efficiency is doubled. For a scene-like video such as a monitoring video, the compression efficiency of AVS2 is further doubled, and up to four times that of AVC/H.264, that is, the compression efficiency has reached 600 times.

Although modern video coding technology has already achieved remarkable results and has been widely applied, and the compression efficiency has realized "doubling every ten years", it is far from reaching an ideal level. According to the existing research report, the global data volume reached 2.84 ZB in 2012. By 2020 the figure will rise to 40 ZB, which will double about every two years, of which the monitoring video will account for 44%. In other data such as health data, transaction data, network media, video entertainment data, etc., the image and the video will also account for a large proportion. In China, more than 30 million cameras have been installed in public places, and these cameras have produced nearly 100 EB video which requires hundreds of billions of yuan in storage. Therefore, the technological progress of "doubling every ten years" in video coding efficiency has been far from satisfying the rapid growth of "doubling every two years" in video big data, and how to improve the video coding efficiency has become a major challenge in the information age.

As mentioned above, the formation of video concept originates from the invention of film, and the basis for the technique scheme of representing a video with an image sequence is visual persistence phenomenon of human vision. The film uses 24 frames per second and the television uses 25 or 30 frames per second, which can basically meet the needs of human eyes to get a continuous sense. This technical setting is also solidified as a technical formula with the wide application of film, television and personal camera equipment. However, the disadvantages of this method of representing dynamic images are also obvious. It can't record high-speed movements such as a rotating wheel, a high-speed sport table tennis or even soccer. It also fails to catch the movement details in video monitoring, and it can't support scientific research, high-precision detection and other special requirements. New high-definition and ultra-high definition televisions are also trying to increase the frame rate to 60 frames per second or even higher to better represent high-speed sports such as table tennis. However, such a video frame rate can't represent a faster changing physical phenomenon, so high frequency cameras appear. Their frame rate can reach 1000 frames per second, even 10,000 frames or higher. The problem is the large-scale growth of data volume, and the corresponding acquisition and processing circuit design are expensive or even impossible. More importantly, the increase in the frame rate means exposure time of a single frame is reduced, and the exposure of the collected single frame image is seriously insufficient. A way to compensate this is to increase pixel size, which brings about the reduction of spatial resolution. In the final analysis, all of these problems are caused by video acquisition and representation using "first space, after time" equal time interval method. This method is only a technological choice based on the persistence characteristics of human vision when the film appears, does not mean it is the best solution to represent dynamic images.

Therefore, it is an urgent problem to develop an effective video coding method that takes account of temporal information and spatial information simultaneously.

SUMMARY

Embodiments of the present invention provide a method and device for encoding space-time signals, so as to provide a coding method for space-time signals that takes account of temporal information and spatial information simultaneously.

In order to realize the above purpose, the present invention adopts the following technical solutions.

According to one aspect of the present invention, a method for encoding space-time signals is provided, including:

collecting a space-time signal at each one of local spatial positions in a monitoring area, the local spatial positions constituting the monitoring area;

performing time-domain coding on the space-time signal at the each local spatial position to obtain a pulse sequence representing a change process of the space-time signal at the each local spatial position; and performing space-domain coding on pulse sequences of all of the local spatial position according to a spatial position relation to obtain a pulse sequence array.

Performing time-domain coding on the space-time signal at the each local spatial position to obtain a pulse sequence representing a change process of the space-time signal at the each local spatial position comprises:

accumulating the space-time signal at the each local spatial position according to time to obtain a cumulative signal intensity value;

transforming the cumulative signal intensity value, and outputting a pulse signal when a transformation result exceeds a specific threshold; and arranging pulse signals corresponding to the each local spatial position into a sequence according to time, so as to obtain the pulse sequence representing the change process of the space-time signal at the each local spatial location.

Collecting a space-time signal at each one of local spatial positions in a monitoring area comprises:

collecting the space-time signal from a designated local spatial position by each signal collector to complete time-domain sampling; and completing space-domain sampling of the monitoring area by a plurality of signal collectors arranging into an array and cooperating with each other to cover the monitoring area.

The space-time signal is an optical signal, and the signal collector is a photosensitive device, and accumulating the space-time signal at the each local spatial position according to the time to obtain a cumulative signal intensity value comprises:

an electrical signal intensity output by an signal collector through a photoelectric conversion being positively correlated to a collected light intensity; the signal collector being connected to one or more signal accumulators, and the signal collector transmitting the electrical signal intensity to the connected signal accumulators;

accumulating a signal in a past period of time by the signal accumulators, and output ends of the signal accumulators being the cumulative signal intensity value; one signal accumulator being connected to one filter, and the signal accumulator transmitting the cumulative signal intensity value to the connected filter; and the filter taking one or more signal accumulators as input, transforming input cumulative signal intensity values according to a specific filter function, and outputting a pulse signal corresponding to a local spatial position when a transformation result exceeds the specific threshold.

When the signal collector is connected to multiple signal accumulators, the signal collector outputs the electrical signal intensity to all downstream signal accumulators at a same time; or, the electrical signal intensity is evenly assigned to all downstream signal accumulators; or, the electrical signal intensity is assigned to all downstream signal accumulators according to a certain weight, and the weight is a function of a spatial position distance between the multiple signal accumulators and the signal collector.

The multiple signal accumulators are time-limited rolling signal accumulators or time-unlimited signal accumulators, the time-limited rolling signal accumulators only accumulate a signal in a specific period of time before a current time, and an earlier signal is automatically cleared; and the time-unlimited signal accumulators implement accumulation continuously.

The filter function of the filter is set according to a sparsity of a spatial position that the filter needs to capture, and the sparsity of the spatial position that the filter needs to capture is determined according to a local spatial scope of a signal collected by a signal collector associated with the filter; and/or the monitoring area is covered by using multiple filters through a redundant design, and a sparse mode of the each local spatial position in the monitoring area can be captured by a corresponding filter; and/or a multi-level redundancy design is adopted on space scale coverage for the multiple filters, the filters of different levels are sensitive to spatial sparsity of corresponding space scales, and an effective capture of any scale sparsity in the monitoring area is realized by a cooperation of the multi-level filters; and/or the filter transforms the cumulative signal intensity values from the one or more signal accumulators according to a set filter function, so as to obtain transformation coefficients related to signal distribution within a local spatial position, when a transformation coefficient exceeds a preset threshold, the filter outputs a pulse signal which carries a pulse intensity, and there is a corresponding relationship between the pulse intensity and the cumulative signal intensity value; and/or after the filter outputs pulse signals, all signal accumulators corresponding to the filter are reset.

The filter is a binary filter, and the filter function is a threshold function;

when there is only one signal accumulator as an input of the binary filter, if the cumulative signal intensity value input by the signal accumulator exceeds a specified threshold, the binary filter outputs a pulse signal, otherwise no pulse signal is output; or, when there are multiple signal accumulators as inputs of the binary filter, the binary filter implements a simple accumulation or a weighted accumulation according to certain rules, and performs a filtering transformation for cumulative signal intensity values input by the multiple signal accumulators, if a transformation result exceeds a specified threshold, the binary filter outputs a pulse signal, otherwise no pulse signal is output.

The method further comprises:

performing time-domain discrete representation for pulse outputs of the filter by using a high frequency clock, so that the pulse outputs of the filter occur only at times of equal intervals, transformation coefficients output by all filters at a same time forming a sparse array, a transformation coefficient corresponding to filters without output at the time being 0, and sparse arrays being arranged into a transformation coefficient array in a sequence of equal time intervals.

Pulses output binary filter are represented by binary numbers, when the binary filter outputs a pulse, it is represented by 1, otherwise it is represented by 0; at a same time, a binary filter with a pulse output outputs 1, and a binary filter without pulse output outputs 0; and all outputs at the same time constitute a binary sparse array according to a filter array, and binary sparse arrays at all times are arranged into a binary sparse sequence array according to a sequence of equal time intervals specified by a clock.

The method further comprises:

a signal collector, a signal accumulator and a filter constituting a "collection-accumulation-transformation" triplet in a one-to-one form, that is, each signal collector outputs only one signal accumulator, and each signal accumulator outputs only one filter; a signal intensity of an output end of the signal accumulator represents an accumulative value of a signal intensity collected by the signal collector over a past period of time, and when the signal intensity exceeds a specific threshold, the filter outputs a pulse signal.

The pulse signal is represented by a binary 1; a pulse sequence of a local spatial position corresponding to a signal collector is a binary sequence in which 1 appears intermittently, and a time interval between two 1s in the sequence indicates required time for accumulating a later 1 of the two 1s; and a binary sequence, in which all numbers are 1, indicates that a signal at the local spatial position corresponding to the signal collector is always in a highest intensity state; and all binary sequences are arranged into a binary sequence array according to spatial positions.

A reconstructed image at time $t_0$ is a pixel value of 1 at position (i, j), which is a number of 1s appeared in a past $\Delta t$ of a corresponding binary sequence, and $\Delta t$ is set as needed.

The method further comprises: representing a binary sequence in a compact way with fewer bits according to a statistical correlation before and after the binary sequence.

The method further comprises: recoding the binary sequence array according to a statistical correlation between adjacent and close sequences in space.

The method further comprises: recovering the binary sequence array according to an inverse process of a compact bit stream generation process.

According to another aspect of the invention, a device for encoding space-time signals is provided, which includes a signal collector, a time-domain coding module and a space-domain coding module;

wherein the signal collector is used to collect a space-time signal at each one of local spatial positions in a monitoring area, and the local spatial positions constitute the monitoring area;

the time-domain coding module is used to perform time-domain coding on the space-time signal of the each local spatial position, so as to obtain a pulse sequence representing a change process of the space-time signal at the each local spatial position; and the space-domain coding module is used to perform space-domain coding on pulse sequences of all of the local spatial positions according to a spatial position relation to obtain a pulse sequence array.

The time-domain coding module comprises:

a signal accumulator, used to accumulate the space-time signal at the each local spatial position according to time to obtain a cumulative signal intensity value;

a filter, used to transform the cumulative signal intensity value, and output a pulse signal when a transformation result exceeds a specific threshold; and a processing unit, used to arrange pulse signals corresponding to the each local spatial position into a sequence according to time, so as to obtain the pulse sequence representing the change process of the space-time signal at the each local spatial location.

The signal collector is specifically used to collect the space-time signal from a designated local spatial position to complete time-domain sampling; and multiple signal collectors are arranged into an array and cooperate with each other to cover the monitoring area, and complete space-domain sampling of the monitoring area.

The space-time signal is an optical signal, and the signal collector is a photosensitive device.

An electrical signal intensity output by the signal collector through a photoelectric conversion is positively correlated to a collected light intensity; the signal collector is connected to one or more signal accumulators, and the signal collector transmits the electrical signal intensity to the connected signal accumulators;

the signal accumulator accumulates a signal in a past period of time, and an output end of the signal accumulator is the cumulative signal intensity value; one signal accumulator is connected to one filter, and the signal accumulator transmits the cumulative signal intensity value to the connected filter; and the filter takes one or more signal accumulator as input, transforms input cumulative signal intensity values according to a specific filter function, and outputs a pulse signal corresponding to a local spatial position when a transformation result exceeds the specific threshold.

When the signal collector is connected to multiple signal accumulators, the signal collector outputs the electrical signal intensity to all downstream signal accumulators at a same time; or, the electrical signal intensity is evenly assigned to all downstream signal accumulators; or, the electrical signal intensity is assigned to all downstream signal accumulators according to a certain weight, and the weight is a function of a spatial position distance between the multiple signal accumulators and the signal collector.

The multiple signal accumulator are time-limited rolling signal accumulators or time-unlimited signal accumulator, the time-limited rolling signal accumulators only accumulate a signal in a specific period of time before a current time, and an earlier signal is automatically cleared; and the time-unlimited signal accumulators implement accumulation continuously.

The filter function of the filter is set according to a sparsity of a spatial position that the filter needs to capture, and the sparsity of the spatial position that the filter needs to capture is determined according to a local spatial scope of a signal collected by a signal collector associated with the filter; and/or the monitoring area is covered by using multiple filters through a redundant design, and a sparse mode of the each local spatial position in the monitoring area can be captured by a corresponding filter; a multi-level redundancy design is adopted on space scale coverage for the multiple filters, the filters of different levels are sensitive to spatial sparsity of corresponding space scales, and an effective capture of any scale sparsity in the monitoring area is realized by a cooperation of the multi-level filters; and/or the filter transforms cumulative signal intensity values from the signal accumulator according to a set filter function, so as to obtain transformation coefficients related to signal distribution within a local spatial position, when a transformation coefficient exceeds a preset threshold, the filter outputs a pulse signal which carries a pulse intensity, and there is a corresponding relationship between the pulse intensity and the cumulative signal intensity value; and/or after the filter outputs pulse signals, all signal accumulators corresponding to the filter are reset.

The filter is a binary filter, and the filter function is a threshold function;

when there is only one signal accumulator as an input of the binary filter, if the cumulative signal intensity value input by the signal accumulator exceeds a specified threshold, the binary filter outputs a pulse signal, otherwise no pulse signal is not output;

when there are multiple signal accumulators as inputs of the binary filter, the binary filter implements a simple accumulation or a weighted accumulation according to certain rules, and performs a filtering transformation for cumulative signal intensity values input by the multiple signal accumulators, if a transformation result exceeds a specified threshold, the binary filter outputs a pulse signal, otherwise no pulse signal is output.

The device further comprises: a transformation coefficient processing module, configured to:

perform time-domain discrete representation for pulse outputs of the filter by using a high frequency clock, so that the pulse outputs of the filter occur only at times of equal intervals, transformation coefficients output by all filters at a same time form a sparse array, a transformation coefficient corresponding to filters without output at the time is 0, and sparse arrays are arranged into a transformation coefficient array in a sequence of equal time intervals.

Pulses output binary filter are represented by binary numbers, when the binary filter outputs a pulse, it is represented by 1, otherwise it is represented by 0; at a same time, a binary filter with a pulse output outputs 1, and a binary filter without pulse output outputs 0; and the space-domain coding module is further configured to: outputs of all binary filters at a same time constitute a binary sparse array according to a filter array, binary sparse arrays at all times are arranged into a binary sparse sequence array according to a sequence of equal time intervals specified by a clock.

The signal collector, the signal accumulator and the filter constitute a "collection-accumulation-transformation" triplet in a one-to-one form, that is, each signal collector outputs only one signal accumulator, and each signal accumulator outputs only one filter; a signal intensity of an output end of the signal accumulator represents an accumulative value of a signal intensity collected by the signal collector over a past period of time, and when the signal intensity exceeds a specific threshold, the filter outputs a pulse signal.

The pulse signal is represented by binary 1; a pulse sequence of a local spatial position corresponding to the signal collector is a binary sequence in which 1 appears intermittently, and a time interval between two 1s in the sequence indicates required time for accumulating a later 1 of the two 1s; and a binary sequence, in which all numbers are 1, indicates that a signal at the local spatial position corresponding to the signal collector is always in a highest intensity state; and all binary sequences are arranged into a binary sequence array according to spatial positions.

The signal collector is a photosensitive device, and all signal collectors are arranged into a photosensitive array, the signal accumulator is a photoelectric conversion circuit with a time accumulation function, the filter is a binary pulse filter, and the signal accumulator and the filter constitute a time-delay binary pulse filter, the device is a new type of camera device, in which an imaging unit works independently, and indicates a signal intensity corresponding to a local spatial position by outputting a pulse when a collected light intensity reaches a threshold.

An operating frequency of the filter is higher than 1000 Hz.

The signal collector is a high-sensitivity photosensitive device, the signal accumulator is a high-sensitivity converter, the signal collector and the signal accumulator cooperate to accurately measure a quantity of collected photons, a time interval of pulses output from the filter is at a picosecond level, and an output binary sequence array represents a number of photon irradiation in the monitoring area.

From the technical scheme provided by the embodiments of the present invention, it can be seen that the embodiments of the present are based on the idea of performing time-domain encoding and then space-domain encoding to propose that a space-time signal of a local spatial position is accumulated according to periods of time, a cumulative signal intensity value of the local spatial position is transformed according to a spatial sparsity, and a pulse signal corresponding to the local spatial position is output. Thus, a change process of each local spatial position can be preserved, and a movement process of a high-speed moving object can be finely reconstructed, which can provide an abundant information source for subsequent motion analysis and object detection and tracking, while the frame rate is the upper limit of the change information preserved in the traditional video. The image at any time can be reconstructed, while the traditional video only retains the image at the frame sampling time.

The additional aspects and advantages of the present invention will be partly given in the following description, which will be obvious from the following description or be understood through the practice of the present invention.

BRIEF DESCRIPTION OF DRAWINGS

In order to clearly illustrate technical solutions of embodiments of the present invention, the drawings used in the description of the embodiments will be briefly described below. Obviously, the drawings in the following descriptions are just some embodiments of the present invention. For those of ordinary skill in the art, other drawings also can be obtained according to these drawings without any creative work.

In the figures, a signal collector 21, a signal accumulator 22 and a filter 23 are shown.

DETAILED DESCRIPTION

In order to make the purpose, technical means and advantages of the present invention clear, the present invention will be further described in detail in conjunction with the accompanying drawings.

Those skilled in the art may understand that, unless specifically stated, singular forms "a", "one", "said" and "the" used herein may also include plural forms. It should be further understood that the word "including" used in the specification of the present invention means the presence of the feature, integer, step, operation, element and/or component, but it does not exclude the presence or addition of one or more other features, integers, steps, operations, elements, components and/or their combination. It should be understood that when an element is referred to being "connected" or "coupled" to another element, it can be directly connected or coupled to other elements, or there can be an intermediate component. In addition, the "connected" or "coupled" used here may include a wireless connection or coupling. The term "and/or" used here includes any unit and all combinations of one or more related listed items.

Those skilled in the art can understand that, unless otherwise defined, all terms (including technical and scientific terms) used herein have the same meanings as generally understood by those of ordinary skill in the art to which the present invention belongs. It should also be understood that, terms such as those defined in universal dictionaries should be understood as having meanings consistent with those in the context of the prior art, and unless defined as here, would not be interpreted in an idealized or overly formal sense.

In order to make embodiments of the present invention easy to be understood, several specific embodiments as examples will be further explained below with reference to the accompanying drawings, and the specific embodiments do not constitute a limitation for the embodiments of the present invention.

The First Embodiment

In order to fundamentally solve the problem of high efficient encoding of space-time signals such as in video, the present invention proposes a new scheme from two aspects of video representation and coding methods. Different from the method of representing a dynamic image as a sequence of image sequence (the "image" here is also called "frame") since the appearance of the film and television, the present invention first collects space-time signal change of each local spatial position constituting a monitoring area (for the image, it is a pixel change process), and performs time-domain coding according to time order respectively. For the dynamic image, this time-sequence signal is called a "pixel stream", which is used to obtain a pulse sequence of representing a change process of the space-time signal at the local spatial position; then, a pulse sequence matrix composed of time-sequence signals of each local spatial position is spatially encoded according to the spatial position relation (Spatial Sparsity) to obtain a pulse sequence array. It needs to be particularly noted that although multiple pixel streams are still arranged into an array according to spatial relative position, each pixel stream does not have equal interval sampling and "frame alignment" as in a traditional video, but retain change information and time-domain sparsity. The spatial encoding for the pixel stream array is not a simple image encoding, but an encoding for signal accumulation in the past period of time within the spatial range. Thus, this method can achieve high-efficiency spatial information encoding while retaining time-domain process information with high precision, and subverts the traditional method of space-time signal coding.

Figure 1:
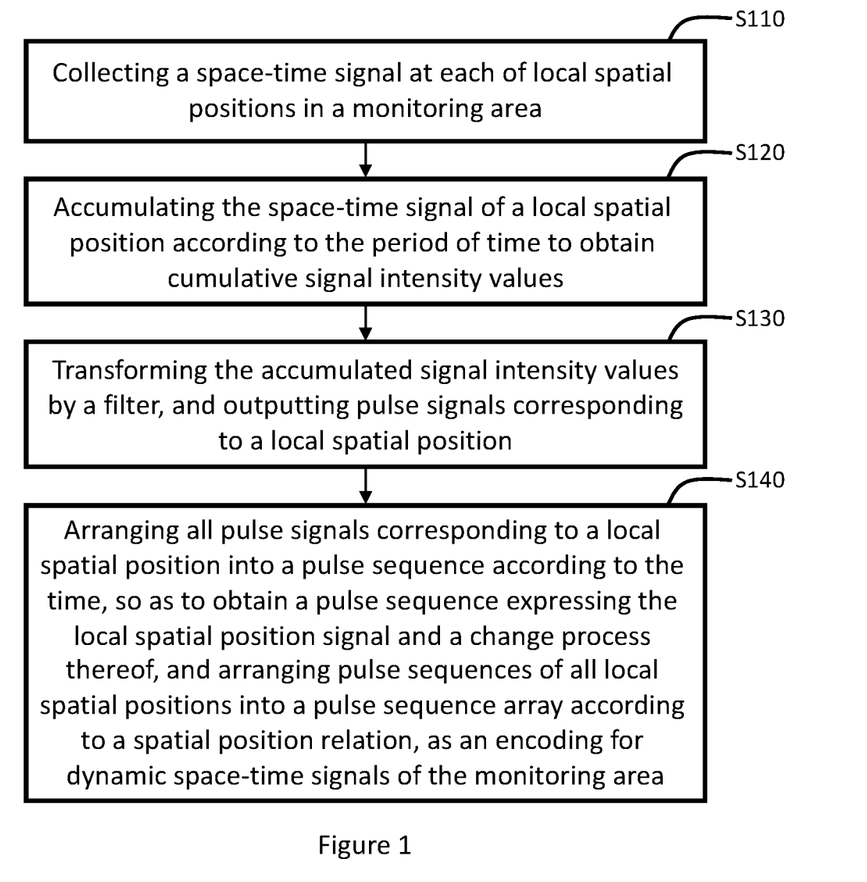
FIG. 1 is a processing flowchart illustrating a method for encoding space-time signals according to a first embodiment of the present invention.

This embodiment provides a process of a method for encoding space-time signals. As shown in FIG. 1, the method includes the following processing steps:

S110: collecting a light signal in a monitoring area by a signal collector, and calculating a signal intensity value of the light signal and transmitting the signal intensity value to a signal accumulator.

Each signal collector collects a space-time signal from a designated local spatial position, generates a pulse sequence, and completes time-domain sampling; a plurality of signal collectors are arranged into an array and cooperate with each other to cover the entire monitoring area, and complete space-domain sampling of the monitoring area.

The space-time signal is an optical signal. The signal collector is a photosensitive device to realize photoelectric conversion, and the intensity of the electrical signal at the output end is positively correlated to the collected light intensity. Each photosensitive device is responsible for a small square local area, and all devices are arranged into a neat square array by ranks. A honeycomb pattern (hexagonal segmentation), triangular segmentation, or other arrangements may also be used, and in this case, the central locations of the signal collectors may not be in a straight line. Each signal collector corresponds to a specific local spatial position, so the signal collector itself identifies the local spatial position of the output optical signal.

Each signal collector collects the space-time signal of the local spatial position according to a set collection time interval. The frame rate of the current common cameras is 24 to 120 (frame/second), that is, the time interval is tens of milliseconds. The time interval of the present invention is obviously shorter, and it can be milliseconds, microseconds, nanoseconds and even picoseconds as required.

A signal collector is connected to one or more signal accumulators, and the signal collector transmits the signal intensity value to the signal accumulators to which it is connected.

S120: calculating a cumulative signal intensity value of each local space position in a past period of time by the signal accumulator, and outputting the cumulative signal intensity value to a filter.

The signal accumulator accumulates the signal in the past period of time, and its output is the cumulative signal intensity value.

A signal collector can output a signal to one or more signal accumulators.

A signal accumulator is connected to only one filter as an input of the filter.

A filter can receive inputs from one or more signal accumulators. That is, a fan-out of the signal accumulator is 1, while a fan-in of the filter can be 1 or greater.

The simplest case is that the signal collector, the signal accumulator and the filter are in a one-to-one correspondence: one signal collector acts as and only as an input of one signal accumulator, and the signal accumulator is then connected to one filter and acts as and only as an input of the filter. The filter only accepts the input of the signal accumulator and does not accept inputs of other signal accumulators.

When a signal collector fans out a plurality of signal accumulators, there are at least three ways to transmit the signal intensity value: when the signal collector is connected to a plurality of signal accumulators, the signal collector outputs the same signal intensity value to all downstream signal accumulators at the same time; or, the signal intensity value is evenly assigned to all downstream signal accumulators; or, the signal intensity value is assigned to all downstream signal accumulators according to a certain weight, and the weight is a function of spatial position distances between the signal accumulators and the signal collector.

The signal accumulator is a time-limited rolling signal accumulator or a time-unlimited signal accumulator. The time-limited rolling signal accumulator only accumulates signal within a specific period of time before the current time, and the earlier signal is automatically cleared; and the time-unlimited signal accumulator implements accumulation continuously.

The signal accumulator transfers cumulative signal intensity value to a filter to which it is connected. The filter takes one or more signal accumulators as inputs and transforms the input cumulative signal intensity values according to a specific filter function.

S130: transforming the cumulative signal intensity values from the signal accumulator according to a specific filter function by the filter, so as to obtain transformation coefficients related to signal distribution within the local spatial position. When a transformation coefficient exceeds a set threshold, the filter outputs a pulse signal represented by a numerical value corresponding to the local spatial position. The pulse signal carries pulse intensity, and there is a corresponding relationship between the pulse intensity and the cumulative signal intensity value. The filter obtains the local spatial position information of the input signal according to the connected signal accumulator.

After the filter outputs the pulse signal, all the signal accumulators of the filter are reset.

In order to capture spatial sparse mode of any location and any scale as much as possible, the filter function of the filter is set according to sparsity of a spatial position that the filter needs to capture, and the sparsity of the spatial position that the filter needs to capture is determined according to a local spatial scope of a signal collected by the signal collector associated with the filter. The monitoring area is covered by using multiple filters through a redundant design, and a sparse mode of each local spatial position in the monitoring area can be captured by a corresponding filter. A multi-level redundancy design is adopted on space scale coverage for the multiple filters. The filters of different levels are sensitive to spatial sparsity of corresponding space scales. An effective capture of any scale sparsity in the monitoring area is realized by a cooperation of the multi-level filters.

The simplest case is that a filter only accepts the input from a signal accumulator. A filter may also receive inputs from a plurality of signal accumulators. Each filter transforms cumulative signal intensity values corresponding to local spatial position from the respective signal accumulator according to a specific filter function, and obtains transformation coefficients corresponding to the local spatial position.

A simple form of filter is a binary filter, that is, the filter function is a threshold function. When there is only a signal accumulator as the input of the binary filter, if the cumulative signal intensity value input by the signal accumulator exceeds a specified threshold, the binary filter outputs a pulse signal, otherwise no pulse signal is output.

When there are multiple signal accumulators as inputs of the binary fitter, the binary filter implements a simple accumulation or a weighted accumulation according to certain rules, and performs a filtering transformation for cumulative signal intensity values input by the multiple signal accumulators. If the transformation result exceeds a specified threshold, the binary filter outputs a pulse signal, otherwise no pulse signal is output. In the weighted accumulation process of the cumulative signal intensity values, the earlier the collection time, the lower the signal weight.

The pulses output the binary filter are represented by binary numbers. When the filter outputs a pulse, it is represented by 1, otherwise it is represented by 0. At the same time, the binary filter with a pulse output outputs 1, and the binary filter without pulse output outputs 0. All these outputs at the same time constitute a binary sparse array according to the filter array. Binary coefficient arrays at all times are arranged into a binary sparse sequence array according to a sequence of equal time intervals specified by the clock, as an efficient binary expression of the space-time signal in the monitoring area.

The signal collector, the signal accumulator and the filter constitute a "collection-accumulation-transformation" triplet in a one-to-one form. That is, each signal collector outputs only one signal accumulator, and each signal accumulator outputs only one filter. The signal intensity at an output end of the signal accumulator represents an accumulative value of signal intensity collected by the signal collector over a past period of time. When the intensity exceeds a specific threshold, the filter outputs a pulse which is represented by a binary 1. In this way, the dynamic signal of the local spatial position corresponding to the signal collector is transformed to a binary sequence in which 1 appears intermittently, and a time interval between two 1s in the binary sequence indicates required time for accumulating a later 1 of the two 1s; and a binary sequence, in which all numbers are 1, indicates that the signal at the local spatial position corresponding to the signal collector is always in a highest intensity state.

Binary sequences generated by all "collection-accumulation-transformation" triplets are arranged into a binary sequence array according to the corresponding local spatial positions, as an efficient binary expression of the space-time signals in the monitoring area.

The signal collector is a photosensitive device, and all signal collectors are arranged into a photosensitive array. The signal accumulator is a photoelectric conversion circuit with a time accumulation function. The filter is a binary pulse filter, and the signal accumulator and the filter constitute a time-delay binary pulse filter. The device is a new type of camera device, in which an imaging unit (i.e., a "signal collector-signal accumulator-filter" group as mentioned above) works independently, and indicates a signal intensity corresponding to a local spatial position by outputting a pulse (binary 1) when the collected light intensity reaches a threshold.

The filter function can be more complex, such as a LoG (Laplacian of Gaussian) filter, which is most sensitive to a speckle type input. The filter function of a filter bank may be a family of functions that satisfies a certain relationship, and a typical example is a family of wavelet transform functions.

When a transformation coefficient corresponding to a certain local spatial position calculated by the filter exceeds a set threshold, the filter outputs a pulse signal reflecting the signal intensity of the corresponding local spatial position. The pulse signal can carry pulse intensity information, and the pulse intensity corresponds to the cumulative signal intensity value. When a transformation coefficient corresponding to a certain local spatial position does not exceed a set threshold, the filter does not output the pulse signal, and a low-level signal may be chose to output.

After the filter outputs the pulse signal, all signal accumulators of the filter are reset.

S140: arranging pulse signals corresponding to the local spatial position into a sequence in time order to obtain a pulse sequence expressing the local spatial position signal and a change process thereof; and arranging the pulse sequences of all the local spatial positions into a pulse sequence array according to the spatial position relation, which is served as an encoding for dynamic space-time signals of the monitoring area.

Each filter in the filter array sets its own output pulse signal according to its own threshold, and outputs between filters may not be synchronized. In this way, an encoding with the time-domain characteristic for the cumulative signal intensity value corresponding to the local spatial position is realized.

In practical applications, the filter can be an analog filter, and its output is a pulse sequence array.

In practical applications, the pulse signal output from the filter may only carry one bit of information, namely 0 (no pulse output) or 1 (with pulse output). A pulse sequence matrix is degraded to a bit sequence array, which is called a bit stream array.

In practical applications, an output of the signal accumulator is a value in a certain range. The filter is a digital filter and outputs a value in a certain range. The value output from the filter may have only two states: 0 (no output) or 1 (with output).

The pulse output of the filter is time-domain discretely expressed by using a high frequency clock, which makes the pulse outputs of the filter occur only at the time of equal intervals. Transformation coefficients output by all filters at the same time form a sparse array, and transformation coefficients corresponding to the filters without output at this time are 0. Sparse arrays are arranged into a transformation coefficient array in a sequence of equal time intervals as an efficient expression of the space-time signals in the monitoring area.

An operating frequency of the filter is higher than 1000 Hz, that is, a discrete time interval at which the filter is allowed to output is less than 1 millisecond, and may reach a microsecond, nanosecond or even picosecond level.

The signal collector is a high-sensitivity photosensitive device, and the signal accumulator is a high-sensitivity converter. Cooperating of the signal collector and the signal accumulator may accurately measure the quantity of collected photons. The time interval of pulses output from the filter is at a picosecond level, and the output binary sequence array represents the number of photon irradiation in the monitoring area.

At any time, a transformation coefficient array in the past period of time is inversely transformed by an inverse converter group corresponding to the filter, and space-time signals in the current time are reconstructed.

On the basis of a coefficient array arranged at the previous time, the existing transformation coefficient at the same position is replaced by the transformation coefficient at the current time, and the spatial signal at the current time is reconstructed. The dynamic signals are reconstructed by analogy.

The reconstructed image of time to is a pixel value of I at position (i, j), which is the number of 1 occurred in the corresponding binary sequence in the past Δt, and Δt may be set arbitrarily as needed.

The binary sequence is compactly represented by using fewer bits according to a statistical correlation before and after the binary sequence, which includes, but is not limited to, run-length encoding or arithmetic encoding, etc.

The binary sequence array is recoded according to a statistical correlation between adjacent and close sequences in space, such as arithmetic encoding, so as to reduce the number of bits used.

The binary sequence array is restored according to an inverse process of a compact bit stream generation process.

According to the regularity of the above-mentioned transformation coefficient array or the pulse sequence matrix, prediction coding, run-length coding, entropy coding and other methods are used for compression to form a more efficient compressed bit stream. An original coefficient sequence array is obtained by using a corresponding decoding algorithm for the compressed bit stream.

By analyzing the time-sequence characteristics of the pulse sequence array, the object motion information contained in the input signals may be obtained, and the description of the position and movement process of the object may be obtained. The analysis for the coefficient sequence array may detect an object and attribute the object included in the space-time signals.

The Second Embodiment

Figure 2:
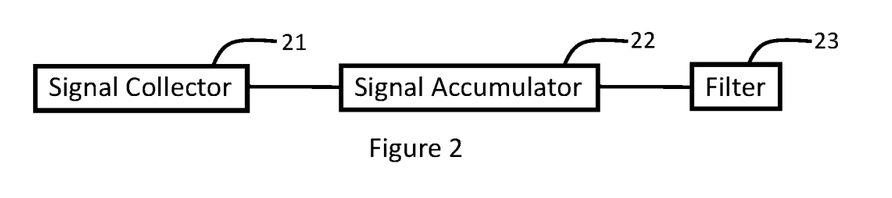
FIG. 2 is a specific implementation diagram illustrating a device for encoding space-time signals according to a second embodiment of the present invention.

This embodiment provides a device for encoding space-time signals. A specific implementation structure of the device includes a signal collector 21, a time-domain coding module and a space-domain coding module.

The signal collector 21 is used for collecting a space-time signal of each of local spatial positions in a monitoring area, wherein the local spatial positions constitute the monitoring area.

The time-domain coding module is used to perform time-domain coding on the space-time signal of the each local spatial position, so as to obtain a pulse sequence representing a change process of the space-time signal at the each local spatial position.

The space-domain coding module is used to perform space-domain coding on pulse sequences of all local spatial positions according to a spatial position relation to obtain a pulse sequence array.

In an embodiment of the present invention, as shown in FIG. 2, the time-domain coding module includes: a signal accumulator 22, a filter 23 and a processing unit.

The signal accumulator 22 is used to accumulate the space-time signal at the local spatial position according to the time to obtain a cumulative signal intensity value;

the filter 23 is used to transform the cumulative signal intensity value, and output a pulse signal when a transformation result exceeds a specific threshold; and the processing unit is used to arrange the pulse signals corresponding to the local spatial position into a sequence in time order to obtain a pulse sequence representing a change process of the space-time signal at the local spatial location.

In an embodiment of the present invention, the signal collector 21 is specifically used to collect the space-time signal from a designated local spatial position to complete time-domain sampling. A plurality of signal collectors 21 are arranged into an array to cooperate with each other to cover the monitoring area, and complete space-domain sampling of the monitoring area.

In an embodiment of the present invention, the space-time signal is an optical signal, and the signal collector 21 is a photosensitive device.

An electrical signal intensity, output by the signal collector 21 through photoelectric conversion, is positively related to the collected light intensity. One signal collector 21 is connected to one or more signal accumulators 22 transfers the electrical signal intensity to the connected signal accumulators 22.

The signal accumulator 22 accumulates a signal in the past period of time, and an output end of the signal accumulator 22 is the cumulative signal intensity value. A signal accumulator 22 is connected to a filter 23 and transfers the cumulative signal intensity value to the connected filter 23.

The filter 23 takes one or more signal accumulators 22 as input, and transforms the input cumulative signal intensity values according to a specific filter function. When a transformation result exceeds a specific threshold, the filter 23 outputs a pulse signal corresponding to the local spatial position.

In an embodiment of the present invention, when the signal collector 21 is connected to multiple signal accumulators 22, the signal collector 21 outputs a same electrical signal intensity to all downstream signal accumulators 22 at the same time; or, the electrical signal intensity is evenly assigned to all downstream signal accumulators 22; or, the electrical signal intensity is assigned to all downstream signal accumulators 22 according to a certain weight, and the weight is a function of spatial position distances between the signal accumulators 22 and the signal collector 21.

In an embodiment of the present invention, the signal accumulator 22 is a time-limited rolling signal accumulator 22 or a time-unlimited signal accumulator 22. The time-limited rolling signal accumulator 22 only accumulates signal in a specific period of time before the current time, and the earlier signal is automatically cleared; and the time-unlimited signal accumulator 22 implements accumulation continuously.

In an embodiment of the present invention, the filter function of the filter 23 is set according to sparsity of a spatial position that the filter 23 needs to capture, and the sparsity of the spatial position that the filter 23 needs to capture is determined according to a local spatial scope of a signal collected by the signal collector 21 associated with the filter 23; and/or the monitoring area is covered by using multiple filters 23 through a redundant design, and a sparse mode of each local spatial position in the monitoring area can be captured by a corresponding filter 23; and/or, a multi-level redundancy design is adopted on space scale coverage for the multiple filters 23, filters 23 of different levels are sensitive to spatial sparsity of corresponding space scales, and an effective capture of any scale sparsity in the monitoring area is realized by a cooperation of the multi-level filters 23; and/or, the filter 23 transforms the cumulative signal intensity value from the signal accumulator 22 according to a set filter function to obtain transformation coefficients related to signal distribution within the local spatial position; when a transformation coefficient exceeds a preset threshold, the filter 23 outputs a pulse signal, the pulse signal carries a pulse intensity, and there is a corresponding relationship between the pulse intensity and the cumulative signal intensity value; and/or, after the filter 23 outputs the pulse signal, all signal accumulators 22 corresponding to the filter 23 are reset.

In an embodiment of the present invention, the filter 23 is a binary filter 23, and the filter function is a threshold function.

When there is only one signal accumulator 22 as an input of the binary filter 23, if the cumulative signal intensity value input by the signal accumulator 22 exceeds a specified threshold, the binary filter 23 outputs a pulse signal, otherwise no pulse signal is output.

When there are a plurality of signal accumulators 22 as inputs of the binary filter 23, the binary filter 23 implements a simple accumulation or a weighted accumulation according to certain rules, and performs a filtering transformation for cumulative signal intensity values input by the plurality of signal accumulators 22. If the transformation result exceeds a specified threshold, the binary filter 23 outputs a pulse signal, otherwise no pulse signal is output.

In an embodiment of the present invention, the device further includes: a transformation coefficient processing module, which is configured to:

discretely represent pulse outputs of the filter 23 in time domain by a high frequency clock, so that the pulse outputs of the filter 23 occur only at equal intervals, transformation coefficients output by all filters 23 at the same time form a sparse array, the transformation coefficients corresponding to filters 23 without output at this time are 0, and sparse arrays are arranged at equal time intervals into a transformation coefficient array as an expression for the space-time signals of the monitoring area.

In an embodiment of the present invention, the pulse output the binary filter 23 is represented by a binary number. When the binary filter 23 outputs a pulse, it is represented by 1, otherwise it is represented by 0; at the same time, the binary filter 23 with a pulse output outputs 1, and the binary filter 23 without output outputs 0.

The space-domain coding module is further configured to: outputs of all binary filters 23 at the same time constitute a binary sparse array according to an array of filters 23; binary sparse arrays at all times are arranged into a binary sparse sequence array according to a sequence of equal time intervals specified by a clock, which acts as a binary expression of the space-time signals in the monitoring area.

In an embodiment of the present invention, the signal collector 21, the signal accumulator 22 and the filter 23 constitute a "collection-accumulation-transformation" triplet in a one-to-one form. That is, each signal collector 21 outputs only one signal accumulator 22, and each signal accumulator 22 outputs only one filter 23. The signal intensity at an output end of the signal accumulator 22 represents an accumulative value of signal intensity collected by the signal collector 21 over a past period of time. When the signal intensity exceeds a specific threshold, the filter 23 outputs a pulse signal.

In an embodiment of the present invention, the pulse signal is represented by a binary 1. The pulse sequence of the local spatial position corresponding to the signal collector 21 is a binary sequence in which 1 appears intermittently, and a time interval between two 1s in the sequence indicates required time for accumulating a later 1 of the two 1s. A binary sequence, in which all the numbers are 1, indicates that the signal at the local spatial position corresponding to the signal collector 21 is always in a highest intensity state.

All binary sequences are arranged into a binary sequence array according to the spatial positions as a binary expression of the space-time signals in the monitoring area.

In an embodiment of the present invention, the signal collector 21 is a photosensitive device, and all signal collectors 21 are arranged into a photosensitive array. The signal accumulator 22 is a photoelectric conversion circuit with a time accumulation function. The filter 23 is a binary pulse filter 23, and the signal accumulator 22 and the filter 23 constitute a time-delay binary pulse filter 23. The device is a new type of camera device, in which an imaging unit works independently, and outputs a pulse to indicate a signal intensity corresponding to a local spatial position when the collected light intensity reaches a threshold. An operating frequency of the filter 23 is higher than 1000 Hz.

In an embodiment of the present invention, the signal collector 21 is a high-sensitivity photosensitive device, and the signal accumulator 22 is a high-sensitivity converter. The signal collector 21 and the signal accumulator 22 cooperate to accurately measure the quantity of collected photons. The time interval of pulses output from the filter 23 is at a picosecond level, and the output binary sequence array represents the number of photon irradiation in the monitoring area.

The specific process of encoding the space-time signals by the device according to the embodiments of the present invention is similar to the embodiments of the method described previously, and will not be described in detail here.

In summary, the embodiments of the present are based on the idea of performing time-domain encoding and then space-domain encoding to propose that a space-time signal of a local spatial position is accumulated according to periods of time, a cumulative signal intensity value of the local spatial position is transformed according to a spatial sparsity, and a pulse signal corresponding to the local spatial position is output. Further, a sequence signal of the local spatial position is obtained, and sequence signals of all local spatial positions are arranged into a pulse sequence matrix. Thus, a coding method for space-time signals taking account of temporal information and spatial information simultaneously is provided.

The beneficial effects of the present invention include at least the following:

1) a change process of each local spatial position can be preserved, and a movement process of a high-speed moving object can be finely reconstructed, which can provide an abundant information source for subsequent motion analysis and object detection and tracking, while the frame rate is the upper limit of the change information preserved in the traditional video;

2) an image at any time can be reconstructed: a static image at a specific time is an accumulation of the change process over a past period of time, with the present invention, the image at any time can be reconstructed, while the traditional video only retains the image at the frame sampling time;

3) a high dynamic image at any time and in any space window can be reconstructed: the recording of the traditional video is an accumulation of light changes between two frames, and the corresponding dynamic range is often limited and fixed; with the present invention, the light in any period of time and any space window range can be accumulated, and the obtained dynamic range is determined by the light condition in the period of time and the space range, which is dynamic, and may be high dynamic;

4) it is beneficial for the design of time-domain compression algorithm: inter-frame prediction in traditional video compression involves complex motion estimation and motion compensation calculation, while in the present invention, the time-domain information is directly implied in the original code stream, which does not need to deliberately design complex algorithms such as the inter-frame prediction and the data such as the encoding motion vector, moreover, since the code stream of the present invention is "continuous" in the time domain (the time interval is also particularly small in the discrete mode, such as milliseconds or even smaller), and the correlation is stronger, it is easier to design efficient encoding algorithms;

5) it is beneficial for improving the efficiency of the space-domain compression: in the traditional video, the light changes in a period of time (between two frames) are "squeezed" forcibly in an image, which improves the complexity of the image, and improves the difficulty of the space-domain coding (mainly referring to the transform coding) in the traditional video compression, the cost of the residual expression is much; in the present invention, the dynamic image is represented by the sequence array, which may continue to use the transform coding method to compress (corresponding to the filter function and the family of functions of the filter bank), filters are not "forced" to perform transform coding synchronously at the same time as traditional methods, but each filter decides whether to output at any time according to its own input mode, so signal modes in the space domain may be captured better, and the efficiency of the space-domain compression is improved.

Those of ordinary skill in the art can understand that the drawings are just schematic diagrams of an embodiment, and the modules or processes in the drawings are not necessarily required to implement the present invention.

It can be known from description of the above embodiments that, those skilled in the art may clearly understand that the present invention may be implemented by means of software in combination with a necessary general hardware platform. Based on such understanding, the essential part or the part contributing to the prior art of technical solutions of the present invention may be embodied in the form of a software product. The computer software produce may be stored in a storage medium such as a ROM/RAM, a magnetic disc, an optical disc, etc., including several instructions to enable a computer device (which may be a personal computer, a server, or a network device) to execute the methods described in the embodiments of the present invention or some parts of the embodiments.

The embodiments in this specification are described in a progressive manner. The identical or similar parts among the embodiments can be referred to each other. Each embodiment focuses on differences from other embodiments. In particular, for the device or system embodiments, since they are basically similar to the method embodiments, the description is relatively simple, and the relevant parts may be obtained with reference to the description of the corresponding parts of the method embodiments. Device and system embodiments described above are merely exemplary, in which the units described as separate parts may or may not be physically separate, and the parts displayed as units may or may not be physical units, that is, they may be located in one place, or may be distributed to a plurality of network units. Some or all of the modules may be selected according to actual needs to achieve the purposes of the solutions of the embodiments. Those of ordinary skill in the art may understand and implement the present invention without creative efforts.

The above descriptions are merely preferred specific embodiments of the present invention, but the protection scope of the present invention is not limited thereto. Variations or alternatives that may be easily derived by those skilled in the art within the technical scope disclosed by the present invention should fall in the protection scope of the present invention. Therefore, the protection scope of the present invention shall be based on the protection scope of the claims.

What is claimed is:

1. A method for encoding space-time signals, comprising:
   collecting a space-time signal at each one of local spatial positions in a monitoring area, the local spatial positions constituting the monitoring area;
   performing time-domain coding on the space-time signal at the each local spatial position to obtain a pulse sequence representing a change process of the space-time signal at the each local spatial position; and
   performing space-domain coding on pulse sequences of all of the local spatial position according to a spatial position relation to obtain a pulse sequence array.

2. The method for encoding space-time signals according to claim 1, wherein collecting a space-time signal at each one of local spatial positions in a monitoring area comprises:
   collecting the space-time signal from a designated local spatial position by each one of a plurality of signal collectors to complete time-domain sampling; and performing space-domain sampling of the monitoring area by the plurality of signal collectors arranging into an array and cooperating with each other to cover the monitoring area.

3. The method for encoding space-time signals according to claim 1, wherein performing time-domain coding on the space-time signal at the each local spatial position to obtain a pulse sequence representing a change process of the space-time signal at the each local spatial position comprises:
   accumulating the space-time signal at the each local spatial position according to time to obtain a cumulative signal intensity value;
   transforming the cumulative signal intensity value, and outputting a pulse signal when a transformation result exceeds a specific threshold; and
   arranging pulse signals corresponding to the each local spatial position into a sequence according to time, so as to obtain the pulse sequence representing the change process of the space-time signal at the each local spatial location.

4. The method for encoding space-time signals according to claim 3, wherein the space-time signal is an optical signal and is collected by a signal collector, and the signal collector is a photosensitive device, and accumulating the space-time signal at the each local spatial position according to the time to obtain a cumulative signal intensity value comprises:
   an electrical signal intensity output by the signal collector through a photoelectric conversion being positively correlated to a collected light intensity; the signal collector being connected to one or more signal accumulators, and the signal collector transmitting the electrical signal intensity to the connected one or more signal accumulators;
   accumulating a signal in a past period of time by the one or more signal accumulators, and output ends of the one or more signal accumulators being the cumulative signal intensity value; one signal accumulator being connected to one filter, and the one signal accumulator transmitting the cumulative signal intensity value to the connected filter; and the filter taking the one or more signal accumulators as input, transforming input cumulative signal intensity values according to a specific filter function, and outputting a pulse signal corresponding to a local spatial position when a transformation result exceeds the specific threshold.

5. The method for encoding space-time signals according to claim 4, wherein when the signal collector is connected to multiple signal accumulators, the signal collector outputs the electrical signal intensity to all downstream signal accumulators at a same time; or, the electrical signal intensity is evenly assigned to all downstream signal accumulators; or, the electrical signal intensity is assigned to all downstream signal accumulators according to a certain weight, and the weight is a function of a spatial position distance between the multiple signal accumulators and the signal collector.

6. The method for encoding space-time signals according to claim 4, wherein the multiple signal accumulators are time-limited rolling signal accumulators or time-unlimited signal accumulators, the time-limited rolling signal accumulators only accumulate a signal in a specific period of time before a current time, and an earlier signal is automatically cleared; and the time-unlimited signal accumulators implement accumulation continuously.

7. The method for encoding space-time signals according to claim 4, wherein the filter function of the filter is set according to a sparsity of a spatial position that the filter needs to capture, and the sparsity of the spatial position that the filter needs to capture is determined according to a local spatial scope of a signal collected by the signal collector associated with the filter; and/or the monitoring area is covered by using multiple filters through a redundant design, and a sparse mode of the each local spatial position in the monitoring area is captured by a corresponding filter; and/or a multi-level redundancy design is adopted on space scale coverage for the multiple filters, the multiple filters of different levels are sensitive to spatial sparsity of corresponding space scales, and an effective capture of any scale sparsity in the monitoring area is realized by a cooperation of the multi-level filters; and/or the filter transforms the cumulative signal intensity values from the one or more signal accumulators according to a set filter function, so as to obtain transformation coefficients related to signal distribution within a local spatial position, when a transformation coefficient exceeds a preset threshold, the filter outputs a pulse signal which carries a pulse intensity, and there is a corresponding relationship between the pulse intensity and the cumulative signal intensity value; and/or after the filter outputs pulse signals, all signal accumulators corresponding to the filter are reset.

8. The method for encoding space-time signals according to claim 7, further comprising:

performing time-domain discrete representation for pulse outputs of the filter by using a high frequency clock, so that the pulse outputs of the filter occur only at times of equal intervals, transformation coefficients output by all filters at a same time forming a sparse array, a transformation coefficient corresponding to the filter without output at the time being 0, and sparse arrays being arranged into a transformation coefficient array in a sequence of equal time intervals.

9. The method for encoding space-time signals according to claim 7, wherein the filter is a binary filter, and the filter function is a threshold function;

when there is only one signal accumulator as an input of the binary filter, if the cumulative signal intensity value input by the signal accumulator exceeds a specified threshold, the binary filter outputs a pulse signal, otherwise no pulse signal is output; or, when there are multiple signal accumulators as inputs of the binary filter, the binary filter implements a simple accumulation or a weighted accumulation according to certain rules, and performs a filtering transformation for cumulative signal intensity values input by the multiple signal accumulators, if a transformation result exceeds a specified threshold, the binary filter outputs a pulse signal, otherwise no pulse signal is output.

10. The method for encoding space-time signals according to claim 9, wherein pulses output by the binary filter are represented by binary numbers, when the binary filter outputs a pulse, it is represented by 1, otherwise it is represented by 0; at a same time, the binary filter with a pulse output outputs 1, and the binary filter without pulse output outputs 0; and all outputs at the same time constitute a binary sparse array according to a filter array, and binary sparse arrays at all times are arranged into a binary sparse sequence array according to a sequence of equal time intervals specified by a clock.

11. The method for encoding space-time signals according to claim 4, wherein the signal collector, the signal accumulator and the filter constitute a "collection-accumulation-transformation" triplet in a one-to-one form, that is, each signal collector outputs only one signal accumulator, and each signal accumulator outputs only one filter; a signal intensity of an output end of the signal accumulator represents an accumulative value of a signal intensity collected by the signal collector over a past period of time, and when the signal intensity exceeds a specific threshold, the filter outputs a pulse signal.

12. The method for encoding space-time signals according to claim 4, wherein the pulse signal is represented by a binary 1; a pulse sequence of a local spatial position corresponding to a signal collector is a binary sequence in which 1 appears intermittently, and a time interval between two is in the sequence indicates required time for accumulating a later 1 of the two 1s; and a binary sequence, in which all numbers are 1, indicates that a signal at the local spatial position corresponding to the signal collector is always in a highest intensity state; and all binary sequences are arranged into a binary sequence array according to spatial positions.

13. The method for encoding space-time signals according to claim 12, wherein a reconstructed image at time to is a pixel value of I at position (i, j), which is a number of 1s appeared in a past $\Delta t$ of a corresponding binary sequence, and $\Delta t$ is set as needed.

14. The method for encoding space-time signals according to claim 12, further comprising: representing a binary sequence in a compact way with fewer bits according to a statistical correlation before and after the binary sequence.

15. The method for encoding space-time signals according to claim 14, further comprising: recovering the binary sequence array according to an inverse process of a compact bit stream generation process.

16. The method for encoding space-time signals according to claim 12, further comprising: recoding the binary sequence array according to a statistical correlation between adjacent and close sequences in space.

17. A device for encoding space-time signals, comprising:
a memory, a processor and a computer program stored on the memory and executed by the processor, wherein when the computer program is executed by the processor, the processor implements following steps:
collecting a space-time signal at each one of local spatial positions in a monitoring area, the local spatial positions constituting the monitoring area;
performing time-domain coding on the space-time signal at the each local spatial position to obtain a pulse sequence representing a change process of the space-time signal at the each local spatial position; and
performing space-domain coding on pulse sequences of all of the local spatial position according to a spatial position relation to obtain a pulse sequence array.

18. The device for encoding space-time signals according to claim 17, wherein the processor specifically implements following steps:
collecting the space-time signal from a designated local spatial position by each one of a plurality of signal collectors to complete time-domain sampling; and performing space-domain sampling of the monitoring area by the plurality of signal collectors arranging into an array and cooperating with each other to cover the monitoring area.

19. The device for encoding space-time signals according to claim 17, wherein the processor specifically implements following steps:
accumulating the space-time signal at the each local spatial position according to time to obtain a cumulative signal intensity value;
transforming the cumulative signal intensity value, and outputting a pulse signal when a transformation result exceeds a specific threshold; and
arranging pulse signals corresponding to the each local spatial position into a sequence according to time, so as to obtain the pulse sequence representing the change process of the space-time signal at the each local spatial location.

20. The device for encoding space-time signals according to claim 19, wherein the space-time signal is an optical signal and is collected by the signal collector, the signal collector is a photosensitive device, and the processor specifically implements following steps:
an electrical signal intensity output by the signal collector through a photoelectric conversion being positively correlated to a collected light intensity; the signal collector being connected to one or more signal accumulators, and the signal collector transmitting the electrical signal intensity to the connected one or more signal accumulators;
accumulating a signal in a past period of time by the one or more signal accumulators, and output ends of the one or more signal accumulators being the cumulative signal intensity value; one signal accumulator being connected to one filter, and the one signal accumulator transmitting the cumulative signal intensity value to the connected filter; and
the filter taking the one or more signal accumulators as input, transforming input cumulative signal intensity values according to a specific filter function, and outputting a pulse signal corresponding to a local spatial position when a transformation result exceeds the specific threshold.

* * * * *